United States Patent [19]

Hung

[11] Patent Number: 5,247,653
[45] Date of Patent: Sep. 21, 1993

[54] ADAPTIVE SEGMENT CONTROL AND METHOD FOR SIMULATING A MULTI-SEGMENT CACHE

[75] Inventor: Fan K. F. Hung, Chaska, Minn.

[73] Assignee: Seagate Technology, Inc., Scotts Valley, Calif.

[21] Appl. No.: 568,962

[22] Filed: Aug. 17, 1990

[51] Int. Cl.$^5$ .............................................. G06F 9/455
[52] U.S. Cl. ................................. 395/500; 395/425; 364/DIG. 2; 364/933.8; 364/148
[58] Field of Search .............................. 395/425, 500; 364/148-152, 578

[56] References Cited

U.S. PATENT DOCUMENTS

| | | | |
|---|---|---|---|
| 4,315,312 | 2/1982 | Schmidt | 395/425 |
| 4,489,378 | 12/1984 | Dixon et al. | 364/200 |
| 4,654,782 | 3/1987 | Bannai et al. | 395/400 |
| 4,947,319 | 8/1990 | Bozman | 395/200 |
| 5,131,087 | 7/1992 | Warr | 395/425 |
| 5,133,060 | 7/1992 | Weber et al. | 395/425 |
| 5,148,538 | 9/1992 | Celtruda et al. | 395/425 |

FOREIGN PATENT DOCUMENTS

0066766 12/1982 European Pat. Off.

OTHER PUBLICATIONS

*Biasing Cache Threshold Pointers Toward Less Pre-Staging*, IBM Technical Disclosure Bulletin, vol. 31, No. 8 (Jan. 1989).
*Intelligent Controller for Disk Drives Boosts Performance of Micros*, 8211 Computer Technology Review VI (1986) Summer, No. 3.

Primary Examiner—Robert B. Harrell
Assistant Examiner—Mehmet Geckil
Attorney, Agent, or Firm—Kinney & Lange

[57] ABSTRACT

An adaptive segment control for controlling performance of a multi-segment cache in a storage system. The adaptive segment control segments the cache to operate at a selected working segmentation level. A plurality of virtual cache tables are segmented such that one table operates at the working segmentation level and the other tables operate at different segmentation levels. During operation, the adaptive segment control monitors memory instructions transmitted by a host computer to the storage system and stores the instructions in an instruction queue. While the storage system is in an idle state, the adaptive segment control performs hit ratio simulations on the virtual cache tables by executing a selected number of instructions stored in the instruction queue. The working segmentation level is adjusted to equal the segmentation level of the virtual cache table having the highest hit ratio.

39 Claims, 5 Drawing Sheets

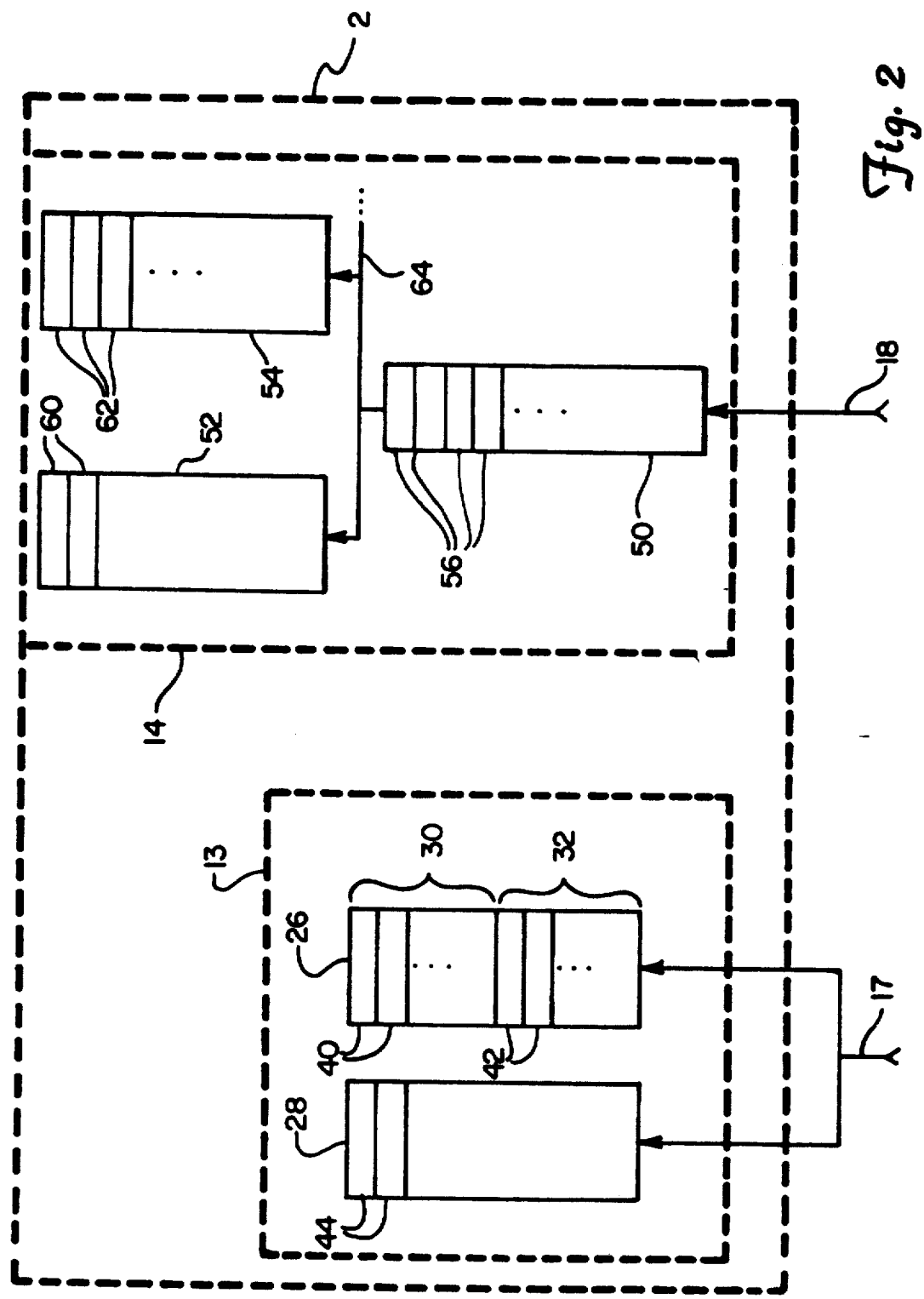

ADAPTIVE SEGMENT CONTROL AND METHOD FOR SIMULATING A MULTI-SEGMENT CACHE

BACKGROUND OF THE INVENTION

The present invention relates to an adaptive segment control for a multi-segment cache memory. In particular, the present invention relates to an adaptive segment control which performs hit ratio simulations on virtual cache tables based on memory instructions received from a host computer.

Cache memories are used within computer storage systems. In a magnetic storage system, for example, the cache memory is located within a disk controller which controls operation of a magnetic disk drive. The disk controller is configured for connection with a host computer through a data bus, such as a small computer systems interface (SCSI). The disk controller passes data back and forth between the disk drive and the host computer in response to memory instructions or commands generated by the host computer.

The magnetic disk drive stores the data on the surface of a rotating magnetic disk. The disk surface includes a plurality of generally concentric data tracks. Each data track is divided into sectors or blocks. In one typical disk drive, each data track is divided into 35 blocks, each block including 512 bytes of data. A byte of data is represented by an individual address in the storage system.

The memory instructions cause the disk controller to initiate read and write operations within the disk drive. Each memory instruction includes a starting address, a block length (the number of blocks required) and an instruction type, such as read or write. After the disk controller receives a read instruction, for example, the controller signals the disk drive to retrieve the required number of blocks beginning at the starting address. After the data has been retrieved, the disk drive controller passes the data back to the host computer.

The cache memory improves storage system performance by reducing the number of times the controller must go to the disk to retrieve data. The cache memory stores the most recently accessed data in random access memory (RAM). When the host computer runs a particular software application, the input/output patterns seen by the disk drive controller tend to repeat. Therefore, there is a greater chance that data obtained from the disk will be used again. When the host computer requests retrieval of data that is in the cache memory, the controller does not have to retrieve the information from the disk but can retrieve it directly from the cache memory. Because the cache memory has a much faster data access time than the disk drive, retrieving the data directly from the cache memory substantially reduces the data access time seen by the host computer.

The cache memory includes a cache buffer and a cache table. In one embodiment, the cache buffer can store up to 192K bytes of data. The cache table maintains a list of the data present in the cache buffer by recording the starting addresses of the data retrieved from the disk. When the controller receives a write instruction that corresponds to addresses present in the cache memory, it updates the cache table such that it no longer indicates the data is present within the buffer. This prevents old data from being read from the cache buffer.

When the controller receives a read instruction, it refers to the cache table to determine whether the requested data is present in the cache buffer. If the data is not present in the cache buffer (cache miss), the controller retrieves the data from the disk and relays the data to the host computer. The controller also loads the data into the cache buffer and updates the cache table. A cache hit occurs when the data requested by the host computer is present in the cache buffer. In this situation, the controller retrieves the information directly from the buffer and transmits the data to the host computer. The ratio of cache hits to cache misses is a measure of cache memory performance.

In a multi-segment cache, the cache buffer is divided into segments. The number of segments in the cache buffer is known as the segmentation level. By segmenting the cache buffer, the controller can perform "look ahead" operations by retrieving excess blocks to fill an entire segment. Because memory operations tend to form repetitive and somewhat predictable patterns, the host computer will likely request data from the next consecutive blocks. The segmentation level determines the number of blocks in each segment and therefore determines the number of excess blocks retrieved. The greater the segmentation level, the smaller the number of blocks in each segment. Performance of the cache memory may be controlled by controlling the number of excess blocks retrieved in a read operation.

The optimum segmentation level depends upon the particular software application running on the host computer. Because the host computer frequently switches between various applications, a selected segmentation level may not achieve the desired performance over a wide range of applications. Therefore, a cache having an adaptive segment control is desired.

Heuristic programming is one method of controlling segmentation level. A statistical performance analysis is performed on the cache memory and these results are applied to a set of rules. The variables applied to the rules include, among others, the number of blocks in each read that are a cache hit and the number of blocks that are a cache miss. However, there is simply not enough information in past statistical performance to predict a preferred segment level. Because there are many exceptions to the rules, heuristic programs do not provide accurate, dependable results. Therefore, there is a continuing need for a multi-segment cache having improved segment control.

SUMMARY OF THE INVENTION

The present invention is an adaptive segment control for controlling performance of a multi-segment cache in a storage system. The adaptive segment control monitors memory instructions which are transmitted by a host computer and received by the storage system. The cache is configured to operate at a selected initial working segmentation level. A plurality of virtual cache tables are connected to receive the monitored memory instructions and are configured such that one table operates at the working segmentation level and the other tables operate at different segmentation levels. The monitored memory instructions are used to determine which virtual cache table obtains the highest hit ratio with its respective segmentation level. The working segmentation level is adjusted to equal the segmentation level of the virtual cache table having the highest hit ratio.

Any number of virtual cache tables may be used in accordance with the present invention. In one embodiment, adaptive segment control includes first and second virtual cache tables. The first virtual cache table is segmented to operate at the selected working segmentation level. The second virtual cache table is segmented to operate at a selected test segmentation level, the test segmentation level being different from the working segmentation level. The test segmentation level is selected by indexing between entries within a look-up table which includes all selectable segmentation levels. In the preferred embodiment, the selectable segmentation levels range from 1 to 16.

In one embodiment, the adaptive segment control includes an instruction queue for storing the memory instructions received by the storage system. To ensure that the instructions stored in the instruction queue are current and representative of the application being executed by the host computer, the instruction queue is flushed after the number of instructions stored is equal to a queue limit such as 30 instructions. After the instruction queue has been flushed, the adaptive segment control continues to store instructions transmitted to the storage system.

Hit ratio simulations are performed on the first and second virtual cache tables by executing a selected number of instructions stored in the instruction queue. The storage system returns to an idle state when all instructions in the instruction queue have been simulated, and resumes hit ratio simulations after the next received instruction is stored in the instruction queue. This process is repeated until the selected number of instructions have been executed on the first and second virtual cache tables. In one embodiment, 100 instructions are simulated in a hit ratio simulation.

Hit ratio values are maintained during the hit ratio simulations for the first and second virtual cache tables. The hit ratio values are compared after execution of the selected number of stored instructions. When the hit ratio value for the second virtual cache table is greater than the hit ratio value for the first virtual cache table, the working segmentation level is adjusted to equal the test segmentation level. The cache memory is reconfigured to operate at the new working segmentation level. Thereafter, the adaptive segment control unit resumes the hit ratio simulations with the new working segmentation level and selects a new test segmentation level.

In one embodiment, the hit ratio simulations are only performed when the storage system is in an idle state. When the storage system receives a memory instruction from the host computer, it operates in a busy state while performing the requested memory operation. Simulation of an individual stored instruction is interrupted upon receipt of the instruction from the host computer. This prevents the hit ratio simulations from interfering with the memory operations. After completion of the memory operation, the storage system returns to the idle state. Thereafter, the interrupted simulation is resumed upon completion of the memory operation. The overhead added by the adaptive segment control is therefore minimal because simulation is performed only when the storage system is idle.

The adaptive segment control of the present invention improves performance of a multi-segment cache by analyzing the instruction pattern received from the host computer. Because the instruction pattern is representative of the application being executed by the host computer, the adaptive segment control adapts the segmentation level of the cache to fit the current application.

The present invention therefore provides an adaptive segment control that is both accurate and dependable over a wide range of software applications.

BRIEF DESCRIPTION OF THE DRAWINGS

FIG. 2 is a diagram of the memory controller shown in FIG. which includes an adaptive segment control unit in accordance with the present invention.

DETAILED DESCRIPTION OF THE PREFERRED EMBODIMENTS

The present invention is an adaptive segment control unit (ASCU) for a multi-segment cache memory in a memory controller. The ASCU performs hit ratio simulations on virtual cache tables to determine a cache memory segmentation level that matches the software application being run on a connected host computer. The hit ratio simulations perform actual instructions received from the host computer on the virtual cache tables.

Figure 1:
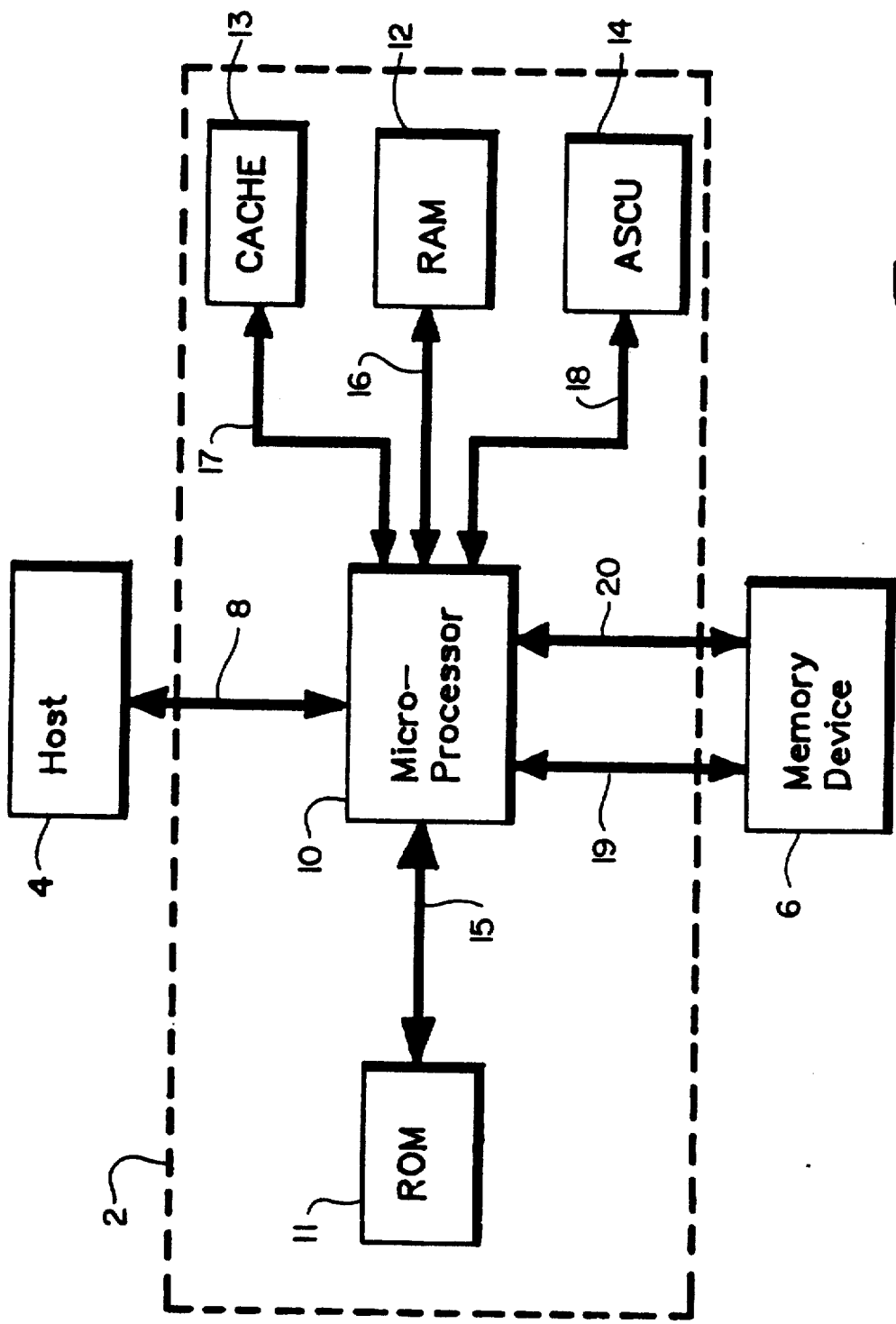
FIG. 1 is a diagram of a memory controller connected between a host computer and a memory device in accordance with the present invention.

FIG. 1 is a diagram of memory controller 2 connected between host computer 4 and memory device 6. Memory controller 2 and memory device 6 form a storage system for host computer 4. Host computer 4 transmits memory instructions to controller 2 through data bus 8. Data bus 8 can be any known communications interface, such as a small computer systems interface (SCSI). Controller 2 includes microprocessor 10, read-only memory (ROM) 11, random-access memory (RAM) 12, cache memory 13 and adaptive segment control unit (ASCU) 14. ROM 11 is connected to microprocessor 10 through data and address lines 15. ROM 11 holds controller software that operates microprocessor 10 to perform memory operations in response to the memory instructions received from host computer 4. RAM 12 is connected to microprocessor 10 through data and address lines 16. Cache memory 13 is connected to microprocessor through data and control lines 17. Adaptive segment control unit 14 is connected to microprocessor through data and control lines 18. The controller software also operates microprocessor 10 to control operation of cache memory 13 and adaptive segment control unit 14.

Memory device 6 is connected to microprocessor 10 through control lines 19 and data bus 20. Microprocessor 10 operates memory device 6 to perform memory operations in response to memory instructions received from host computer 4. During a read operation, host computer 4 generates a read instruction which is decoded by microprocessor 10. Microprocessor 10 transmits control signals through control lines 19 to memory device 6 which cause the memory device to retrieve the requested data. Microprocessor 10 receives the data through data bus 20 and returns the data to host computer 4 through data bus 8. Similarly, during a write operation, host computer 4 generates a write instruction which is decoded by microprocessor 10. Microprocessor 10 transmits write data to memory device 6 through data bus 20. Microprocessor 10 operates memory device 6 through control lines 19 to write the data to the desired memory locations within the memory device.

FIG. 2 is a block diagram of memory controller 2. Controller 2 includes cache memory 13 and adaptive segment control unit 14. Cache memory 13 stores the data most recently accessed from memory device 6. Because the instruction pattern generated by host computer 4 tends to repeat while it runs a particular software application, data stored in cache memory 13 is likely to be used again by the host computer. If the data is requested again by host computer 4, it can be retrieved directly from cache memory 13 rather than from memory device 6. Since data can be retrieved from cache memory 13 much quicker than from memory device 6, the cache memory can significantly increase storage system performance by reducing the average data access time.

Cache memory 13 includes cache buffer 26 and cache table 28. Cache buffer 26 includes a plurality of storage locations 40 and 42 for storing data read from memory device 6. In one embodiment, cache buffer 26 can store up to 192K bytes of data. Cache memory 13 is a multi-segment cache. In other words, cache buffer 26 is divided into segments. The number of segments is known as the segmentation level. For example in the embodiment shown in FIG. 2, cache memory 13 has a segmentation level of 2. Cache buffer 26 is divided into segments 30 and 32. Segment 30 includes storage locations 40. Similarly, segment 32 includes storage locations 42. Cache memory 13 can be configured with any segmentation level.

Memory device 6 (shown in FIG. 1) reads data in blocks or sectors. In one embodiment, a block includes 512 bytes of data. A read instruction generated by host computer 4 includes a starting address and the number of blocks requested. In response to each read instruction, microprocessor 10 retrieves the requested number of blocks of data from memory device 6, beginning at the starting address, and enough additional blocks to fill an entire segment of cache buffer 26. Each storage location 40 and 42 in buffer 26 can store a block of data. The segmentation level determines the number of blocks in each segment. The retrieval of additional blocks is known as a "look ahead" operation. Because a particular application run by host computer 4 tends to form a pattern of read and write instructions, the additional blocks stored in cache buffer 26 have a relatively high probability of being used. Therefore, the look ahead operation further reduces the average data access time of the storage system.

Cache table 28 maintains a list of the data present in cache buffer 26. Cache table 28 includes a plurality of storage locations 44 for storing the starting addresses of each segment of data stored in cache buffer 26. Cache table 28 also stores the number of blocks of data within each segment in cache buffer 26. Microprocessor 10 can determine from cache table 28 whether a particular block of data is present in cache buffer 26 by looking at the starting addresses and the number of blocks in each segment (or segmentation level). For a segmentation level of 2, cache table 28 includes two starting addresses in locations 44. For a segmentation level of 3 (not shown), cache table 28 includes three starting addresses.

When microprocessor 10 receives a read instruction, it refers to cache table 28 to determine whether the requested data is already present in cache buffer 26. If the requested data is present within cache buffer 26 (cache hit), controller 2 retrieves the requested data from the cache buffer and transmits the data to host computer 4 through data bus 8. If cache table 28 indicates that the requested data is not present within cache buffer 26 (cache miss), microprocessor 10 retrieves the requested data from memory device 6 through data bus 20. After the data has been retrieved, microprocessor 10 stores the data in cache buffer 26 and updates cache table 28.

For the embodiment shown in FIG. 2, a first read instruction causes segment 30 of cache buffer 26 to be filled with blocks of data from memory device 6, beginning at the starting address specified in the instruction. A second read instruction causes segment 32 to be filled, beginning at the starting address specified in the second read instruction. The starting addresses for each read instruction are stored in cache table 28, along with the segmentation level.

Adaptive segment control unit 14 improves cache memory performance by dynamically adjusting the segmentation level of cache buffer 26. The optimum segmentation level varies, depending upon the particular software application being run by host computer 4. Because host computer 4 runs a variety of software applications, a selected segmentation level may not be optimal for all the applications. Adaptive segment control unit 14 monitors the instructions received by microprocessor 10 and adapts the segmentation level of cache memory 13 to fit the pattern of instructions received from host computer 4.

Adaptive segment control unit 14 includes instruction queue 50 and virtual cache tables 52 and 54. Instruction queue 50 includes a plurality of storage locations 56, each location for storing an instruction received from host computer 4. In one embodiment, instruction queue 50 can store up to thirty (30) consecutively received instructions. When controller 2 is in an idle state, adaptive segment control unit 14 performs hit ratio simulations on virtual cache tables 52 and 54, based on the stored instructions. The results of the hit ratio simulations are used to adjust the working segmentation level of cache memory 13 to fit the current software application being run by host computer 4.

Prior to performing the hit ratio simulations, virtual cache table 52 is segmented to the working segmentation level of cache memory 13. In the embodiment shown in FIG. 2, the working segmentation level of cache memory 13 is equal to two. Therefore, virtual cache table 52 includes two storage locations 60 for storing two starting addresses. Similarly, virtual cache table 54 includes storage locations 62 for storing starting addresses. Virtual cache table 54 is segmented to a selected test segmentation level which is different from the working segmentation level.

The hit ratio simulations are performed by simulating a selected number of stored instructions (simulation count) on virtual cache tables 52 and 54. While simulating the instructions, adaptive segment control unit 14 maintains a count of the number of cache hits and the number of cache misses for each table 52 and 54. Because tables 52 and 54 are segmented to different segmentation levels, the hit ratios (cache hits/cache misses) of each table will be different after the instructions have been simulated. If the hit ratio of virtual cache table 54 is greater than the hit ratio of cache table 52 after the simulation count, the working segmentation level of cache memory 13 is adjusted to equal the test segmentation level. After the hit ratio simulation is completed, virtual cache table 52 is reconfigured to the new working segmentation level and virtual cache table 54 is reconfigured to a new test segmentation level. The hit ratio simulations are then repeated with a new, current set of stored instructions.

The test segmentation level is selected from a look-up table (not shown). The look-up table contains all of the selectable segmentation levels. In one embodiment, the selectable segmentation levels range from 1 to 16. Adaptive segment control unit 14 indexes between elements in the look-up table from one hit ratio simulation to the next. The entries can be indexed in any preselected order or in a random order.

In an alternative embodiment, adaptive segment control unit 14 includes a plurality of virtual cache tables, as indicated by broken line 64. In this embodiment, each table is configured to a different segmentation level. After the simulations are completed, cache memory 13 is reconfigured to a segmentation level equal to the segmentation level of the virtual cache table having the highest hit ratio.

Figure 3A:
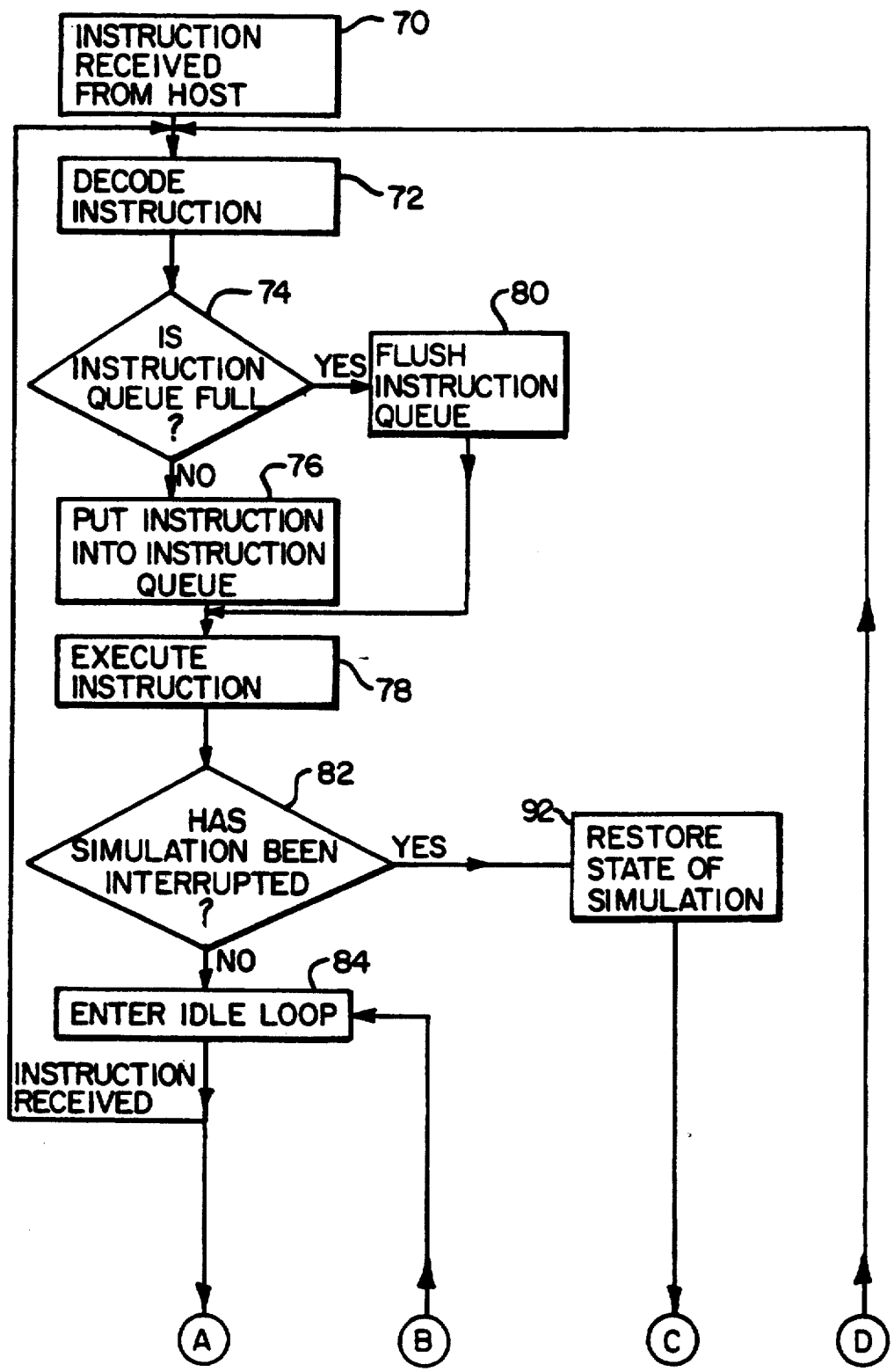
FIGS. 3a and 3b, when joined, form a flow chart which illustrates operation of the memory controller shown in FIGS. 1 and 2.
Figure 3B:
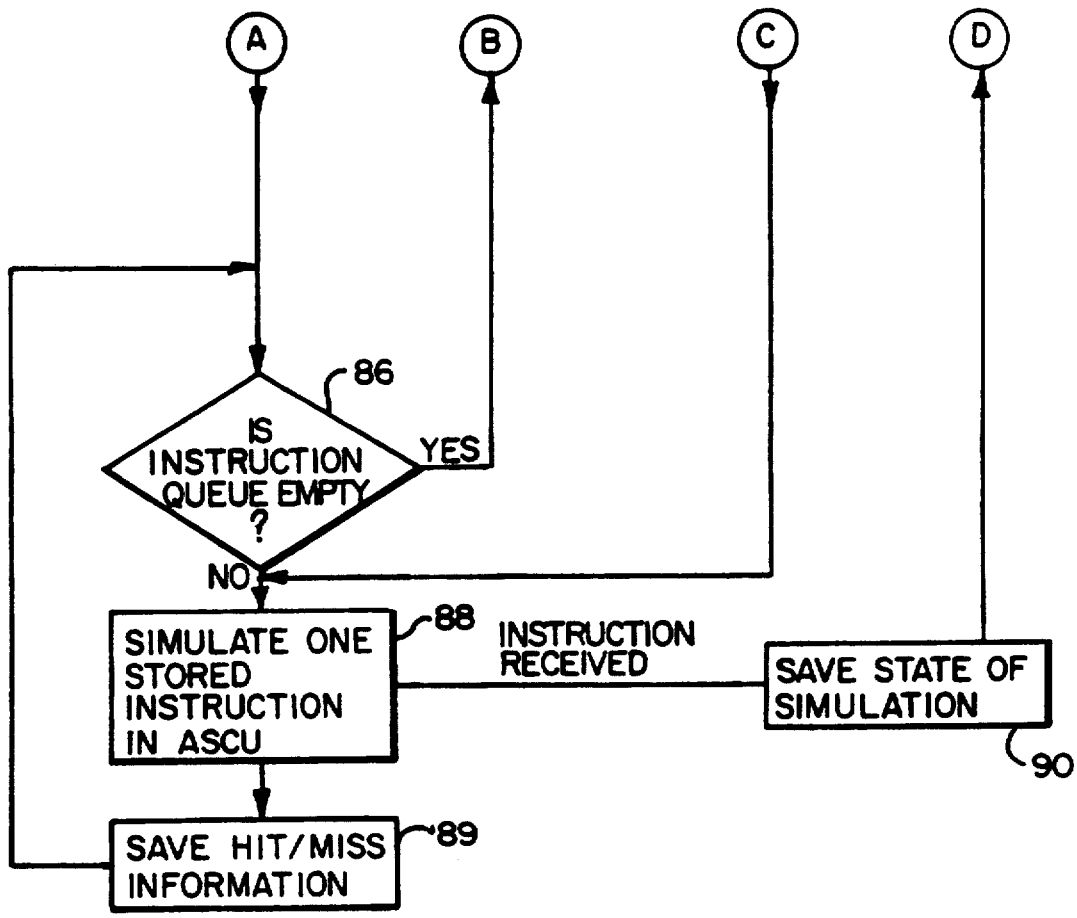

FIGS. 3a and 3b, when joined, form a flow chart which illustrates the operation of controller 2 in greater detail. At step 70, an instruction is received from host computer 4 through data bus 8. At step 72, microprocessor 10 decodes the instruction into a starting address, a block length and an instruction type. The different types of instructions include, among others, read and write instructions.

At step 74, adaptive segment control unit 14 determines whether instruction queue 50 is full. If not, the received instruction is stored in instruction queue 50 at step 76. Next, microprocessor 10 executes the received instruction by performing a memory operation at step 78. Microprocessor 10 operates in a busy state (normal operation) while it executes the received instruction to prevent interference from operation of adaptive segment control unit 14.

If instruction queue 50 is full at step 74, adaptive segment control unit 14 flushes the instruction queue at step 80. Preferably, individual instructions are executed when microprocessor 10 is in the idle state. If microprocessor 10 is too busy to process the instruction simulations, instruction queue 50 will fill up to the queue limit. By flushing instruction queue 50 when it is full, adaptive segment control unit 14 ensures that the instructions stored in the queue are current and representative of the particular application being run by host computer 4.

After instruction queue 50 has been flushed, microprocessor 10 executes the received instruction at step 78. Adaptive segment control unit 14 waits until after a selected number of instructions (wait count) have been subsequently received to begin refilling instruction queue 50. This allows microprocessor 10 to return to a relatively inactive state before the received instructions are stored to further ensure that the instructions in queue 50 are current.

At step 82, adaptive segment control unit 14 determines whether an instruction simulation has been previously interrupted at step 90 (discussed in detail below). If not, microprocessor 10 returns to an idle loop at step 84 in which it operates in the idle state. If an instruction is received from host computer 4 while microprocessor 10 is in the idle loop, microprocessor returns to step 72 to decode the received instruction.

If no instruction is received from host computer 4, adaptive segment control unit 14 determines whether there is an instruction to simulate in queue 50 (step 86).

If queue 50 is empty, microprocessor 10 returns to the idle loop at step 84 and waits for an instruction from host computer 4. If instruction queue 50 is not empty and microprocessor 10 is in the idle state, adaptive segment control unit 14 simulates one of the instructions stored in the queue on virtual cache tables 52 and 54 (step 88). After one instruction has been simulated, adaptive segment control unit 14 stores the resulting cache hit and cache miss information for virtual cache tables 52 and 54 (step 89). Microprocessor 10 returns to step 86 to determine whether there are any instructions left in instruction queue 50. If so, the next instruction is simulated at step 88. This process is repeated until the number of simulated instructions is equal to the simulation count, such as 100.

If an instruction is received from host computer 4 during simulation of a stored instruction, microprocessor 10 interrupts the simulation at step 90. Adaptive segment control unit 14 saves the state of the simulation so that it can be resumed after the received instruction is executed. Microprocessor 10 returns to step 72 to decode and execute the received instruction. After the instruction has been executed at step 78, adaptive segment control unit 14 determines, at step 82, that the simulation has been interrupted. The state of the simulation which was stored at step 90 is restored at step 92 and the simulation is resumed at step 88. In this manner, the normal execution of instructions receives the highest priority so that response time is not affected by operation of adaptive segment control unit 14. Overhead added by adaptive segment control unit simulation is minimal.

Figure 4:
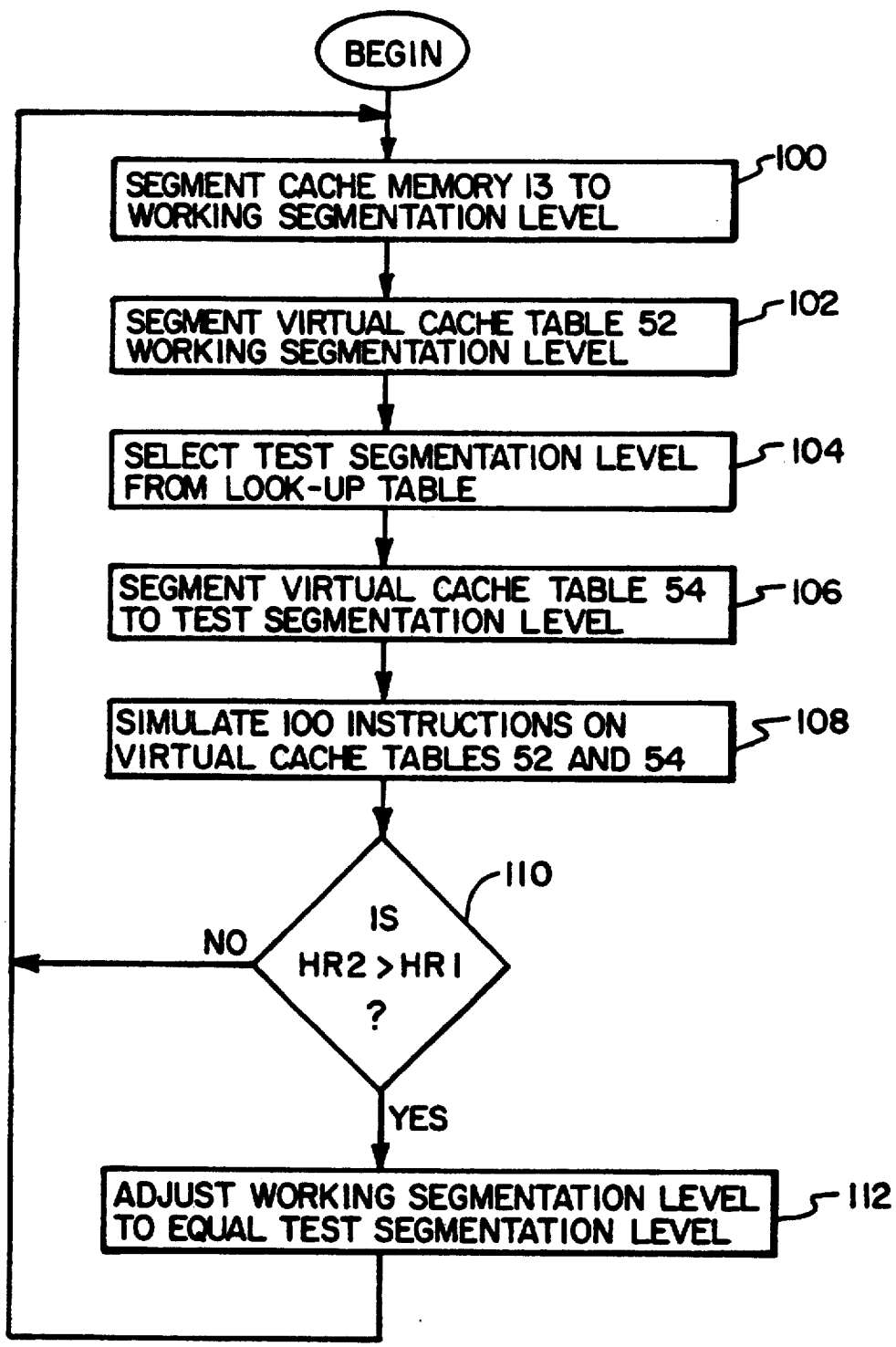
FIG. 4 is a flow chart of a simulation routine performed by the adaptive segment control unit shown in FIG. 2.

FIG. 4 is a flow chart which describes in greater detail the operation of a simulation routine performed by adaptive segment control unit 14. At step 100, cache memory 13 is segmented to a selected working segmentation level. Virtual cache table 52 is also segmented to the working segmentation level (step 102). At step 104, adaptive segment control unit 14 selects the test segmentation level from the look-up table. At step 106, virtual cache table 54 is segmented to the test segmentation level. Next, the adaptive segment control unit 14 simulates 100 instructions on virtual cache tables 52 and 54 (step 108).

The instructions are simulated by removing a stored instruction from instruction queue 50 and processing that instruction on virtual cache tables 52 and 54. For example with a read instruction, adaptive segment control unit 14 determines how many of the requested blocks of data are a cache hit and how many are a cache miss in each virtual cache table 52 and 54. Write instructions are also processed on virtual cache tables 52 and 54. Any addresses written by the write instructions are flushed in each cache table. The number of cache hits and cache misses are summed over the simulation count of 100 instructions.

Upon completion of the simulation, the ratio of cache hits to cache misses of virtual cache table 52 (hit ratio value HR1) is compared at step 110 with that of virtual cache table 54 (hit ratio value HR2). If hit ratio value HR2 is greater than hit ratio value HR1, the working segmentation level is adjusted to equal the test segmentation level at step 112. The simulation routine then returns to steps 100 and 102 to segment cache memory 13 and virtual cache table 52 to the new working segmentation level. A new test segmentation level is selected from the look-up table at step 104. Virtual cache table 54 is reconfigured to the new test segmentation level at step 106.

If hit ratio value HR2 is not greater than hit ratio value HR1, the working segmentation level is not changed. Cache memory 13 and virtual cache table 52 remain at the previous working segmentation level. A new test segmentation level is selected from the look-up table at step 104 and virtual cache table 54 is reconfigured to the new test segmentation level at step 106.

The simulation subroutine shown in FIG. 4 is continuously repeated so that if the instruction pattern produced by host computer 4 changes, the adaptive segment control of the present invention will adjust the working segmentation level accordingly. As a result, performance of cache memory 13 is improved by segmentation regardless of the particular software application being run by host computer 4. The adaptive segment control of the present invention is also more accurate and reliable than other segment control approaches such as heuristic programming because the present invention uses a simulation approach on actual, current instructions, rather than preselected statistical rules. Further, the overhead added by the present invention is minimal because simulation is performed while the memory controller is idle and does not require any attention from the host computer.

Although the present invention has been described with reference to preferred embodiments, workers skilled in the art will recognize that changes may be made in form and detail without departing from the spirit and scope of the invention.

What is claimed is:

1. A computer-implemented method of controlling performance of a first cache memory in a storage system, the method comprising the computer-implemented steps of:
    segmenting the first cache memory to operate at a selected working segmentation level;
    monitoring instructions transmitted by a host computer and received by the first cache memory;
    segmenting a plurality of test cache tables, such that one table operates at the selected working segmentation level and the other test cache tables simultaneously operate at different segmentation levels;
    monitoring instructions transmitted by the host computer and received by the plurality of test cache tables;
    determining a hit ratio for each test cache table based upon the monitored instructions;
    comparing the hit ratios of the test cache tables;
    determining which test cache table obtains a highest hit ratio; and
    adjusting the selected working segmentation level to equal the segmentation level of the test cache table having the highest hit ratio.

2. The method of claim 1 wherein the step of monitoring instructions received by the plurality of test cache tables comprises the step of storing the instructions in an instruction queue.

3. The method of claim 2 wherein the step of storing the instructions comprises the step of storing the consecutively received instructions.

4. The method of claim 2 and further comprising the steps of:
    flushing the instruction queue after the number of stored instructions is equal to a queue limit; and
    repeating the step of storing the instructions after performing the step of flushing the instruction queue.

5. The method of claim 4 and further comprising the step of waiting to repeat the step of storing the instructions until after the number of instructions received subsequently from the host computer is equal to a wait count.

6. The method of claim 2 wherein the step of storing the instructions comprises the steps of:
    storing a starting address for each instruction;
    storing a block length which is indicative of the number of consecutive blocks, beginning at the starting address, that are required by each instruction; and
    storing an instruction type for each instruction.

7. The method of claim 1 wherein the step of segmenting a plurality of test cache tables comprises the steps of:
    segmenting a first test cache table to operate at the selected working segmentation level; and
    segmenting a second test cache table to operate at a selected test segmentation level, the test segmentation level being different from the working segmentation level.

8. The method of claim 7 wherein the step of segmenting the second test cache table comprises the step of selecting the test segmentation level from entries within a look-up table, wherein the table includes all selectable segmentation levels.

9. The method of claim 8 wherein the step of selecting the test segmentation level comprises the step of indexing between entries within the look-up table.

10. The method of claim 8 wherein the selectable segmentation levels range from 1 to 16.

11. The method of claim 7 wherein the step of monitoring instructions received by the plurality of test cache tables comprises the step of storing the instructions in an instruction queue and wherein the step of determining which test cache table obtains the highest hit ratio comprises the steps of:
    performing hit ratio simulations on the first and second test cache tables by executing a selected number of instructions stored in the instruction queue;
    maintaining first and second hit ratio values for the first and second test cache tables, respectively; and
    comparing the first and second hit ratio values after execution of the selected number of stored instructions.

12. The method of claim 11 wherein the step of adjusting the working segmentation level comprises the step of adjusting the working segmentation level to equal the test segmentation level when the second hit ratio value is greater than the first hit ratio value.

13. The method of claim 11 and further comprising the step of repeating the steps of storing instructions, segmenting the first and second test cache tables, performing hit ratio simulations, maintaining first and second hit ratio values, comparing the first and second hit ratio values and adjusting the working segmentation level.

14. The method of claim 11 and further comprising the steps of:
    performing a memory operation on the storage system in response to each instruction received from the host computer;
    operating the storage system in a busy state while performing each memory operation; and returning the storage system to an idle state after completion of each memory operation.

15. The method of claim 14 wherein the steps of performing hit ratio simulations is performed when the storage system is in the idle state and comprises the steps of:
  executing one of the stored instructions on the first and second test cache tables when the instruction queue contains at least one stored instruction and the storage system is in the idle state;
  repeating the step of executing one of the stored instructions until the selected number of stored instructions have been executed; and
  returning the storage system to the idle state when the instruction queue is empty.

16. The method of claim 14 and further comprising the steps of:
  suspending performance of the step of executing one of the stored instructions upon receipt of an instruction from the host computer;
  performing the step of performing a memory operation in response to the received instruction; and
  resuming performance of the step of executing one of the stored instructions upon completion of the memory operation.

17. A computer-implemented method of automatically controlling performance of a first cache memory in a disc drive controller, the method comprising the computer-implemented steps of:
  segmenting the cache to operate at a selected working segmentation level;
  receiving instructions transmitted by a host computer;
  performing memory operations with the disc drive controller in response to the received instructions;
  storing the received instructions in an instruction queue;
  segmenting a first test cache table to operate at the selected working segmentation level;
  segmenting a second test cache table to operate at a selected test segmentation level, the test segmentation level being different from the working segmentation level;
  performing hit ratio simulations on the first and second test cache tables by executing a selected number of stored instructions;
  maintaining first and second hit ratio values for the first and second test cache tables, respectively;
  comparing the first and second hit ratio values after execution of the selected number of stored instructions;
  adjusting the working segmentation level to equal the test segmentation level when the second hit ratio value is greater than the first hit ratio value; and
  repeating the steps of storing the received instructions, segmenting the first and second test tables, performing hit ratio simulations, maintaining first and second hit ratio values, an comparing the first and second hit ratio values, after completion of the step of adjusting the working segmentation level.

18. The method of claim 17 wherein the step of storing the received instructions comprises the step of storing consecutively received instructions.

19. The method of claim 17 and further comprising the steps of:
  flushing the instruction queue after the number of stored instructions is equal to a queue limit; and
  repeating the step of storing the received instructions after performing the step of flushing the instruction queue.

20. The method of claim 19 and further comprising the step of waiting to repeat the step of storing the received instructions until after the number of instructions received from the host computer is equal to a wait count.

21. The method of claim 17 wherein the step of receiving instructions comprises the steps of:
  receiving a starting address for each instruction;
  receiving a block length requested by each instruction; and
  receiving an instruction type for each instruction.

22. The method of claim 17 wherein the step of segmenting the second test cache table comprises the step of selecting the test segmentation level from entries within a look-up table, wherein the entries comprise all selectable segmentation levels.

23. The method of claim 22 wherein the step of selecting the test segmentation level comprises the step of indexing between entries within the look-up table.

24. The method of claim 22 wherein the selectable segmentation levels range from 1 to 16.

25. The method of claim 17 wherein the step of performing memory operations in response to the received instructions comprises the steps of:
  removing the disk drive controller from an idle state;
  operating the disk drive controller in a busy state while performing each memory operation; and
  returning the disk drive controller to the idle state after completion of each memory operation.

26. The method of claim 25 wherein the step of performing hit ratio simulations comprises the steps of:
  executing one of the stored instructions on the first and second virtual cache tables when the instruction queue contains at least one stored instruction and the disk drive controller is in the idle state; and
  repeating the step of executing one of the stored instructions until the selected number of stored instructions have been executed.

27. The method of claim 26 wherein the step of performing hit ratio simulations further comprises the step of returning the storage system to the idle state when the instruction queue is empty.

28. The method of claim 26 and further comprising the steps of:
  suspending performance of the step of executing one of the stored instructions after receipt of an instruction from the host computer;
  performing the step of performing a memory operation in response to the received instruction; and
  resuming performance of the step of executing one of the stored instructions after completion of the memory operation.

29. A computer-implemented adaptive segment control assembly for a storage system, the assembly comprising:
  a multi-segment cache memory having a selectable working segmentation level;
  means, connected to the multi-segment cache memory, for selecting the working segmentation level;
  means, connected to the multi-segment cache memory, for receiving instructions transmitted by a host computer and applying the received instructions to the multi-segment cache memory;
  a plurality of test cache tables which are separate from the multi-segment cache memory;

an instruction queue which is connected to the plurality of test cache tables and is connected to receive instructions transmitted by the host computer and store the received instructions;

means, connected to the plurality of test cache tables, for segmenting the plurality of test cache tables such that one table operates at the selected working segmentation level and the other tables simultaneously operate at different segmentation levels;

means, connected to the test cache tables and the instruction queue, for performing hit ratio simulations on the test cache tables by executing a selected number of stored instructions, maintaining a hit ratio for each test cache table, and determining which test cache table obtains the highest hit ratio; and means, connected to the means for selecting the working segmentation level and to the means for performing hit ratio simulations, for adjusting the selected working segmentation level to equal the segmentation level of the test cache table having the highest hit ratio.

30. The adaptive segment control assembly of claim 29 and further comprising:

means for causing the instruction queue to be flushed after the number of stored instructions is equal to a queue limit; and wherein the instruction queue continues to store instructions after the instruction queue has been flushed.

31. The adaptive segment control assembly of claim 30 and further comprising means for delaying storage of the instructions until after the number of instructions received subsequently from the host computer is equal to a wait count.

32. The adaptive segment control assembly of claim 29 where in the plurality of test cache tables comprises first and second test cache tables and wherein the computer-implemented adaptive segment control assembly further comprises:

means for segmenting the first test cache table at the selected working segmentation level; and means for segmenting a second test cache table at a selected test segmentation level, the test segmentation level being different from the working segmentation level.

33. The adaptive segment control assembly of claim 32 wherein the means for segmenting the second test cache table comprises a look-up table having entries comprising all selectable segmentation levels.

34. The adaptive segment control assembly of claim 33 wherein the means for segmenting the second test cache table further comprises means for indexing between entries within the look-up table.

35. The adaptive segment control assembly of claim 33 wherein the selectable segmentation levels range from 1 to 16.

36. The adaptive segment control assembly of claim 32 wherein the means for adjusting the working segmentation level comprises means for adjusting the working segmentation level to equal the test segmentation level when the hit ratio of the second test cache table is greater than the hit ratio of the first test cache table.

37. The adaptive segment control assembly of claim 32 and further comprising:

means for performing a memory operation of the storage system in response to each instruction received from the host computer;

means for operating the storage system in a busy state while performing each memory operation; and means for returning the storage system to an idle state after completion of each memory operation.

38. The adaptive segment control assembly of claim 37 wherein the means for performing hit ratio simulations comprises:

means for executing one of the selected number of stored instructions on the first and second test cache tables when the instruction queue contains at least one stored instruction and the storage system is in the idle state; and means for returning the storage system to the idle state when the instruction queue is empty.

39. The adaptive segment control assembly of claim and further comprising:

means for suspending execution of a stored instruction upon receipt of an instruction from the host computer;

means for performing a memory operation in response to the received instructions; and means for causing execution of the stored instruction to resume upon completion of the memory operation.

* * * * *

UNITED STATES PATENT AND TRADEMARK OFFICE
CERTIFICATE OF CORRECTION

PATENT NO. : 5,247,653

DATED : September 21, 1993

INVENTOR(S) : FAN KEE F. HUNG

It is certified that error appears in the above-identified patent and that said Letters Patent is hereby corrected as shown below:

Col. 9, line 41, after "tables", insert --which operate separate from the first cache memory--

Col. 11, line 58, delete "an", insert --and--

Col. 14, line 36, delete "claim", insert --claim 37--

Signed and Sealed this

Twenty-ninth Day of March, 1994

*Attest:*

BRUCE LEHMAN

*Attesting Officer*     *Commissioner of Patents and Trademarks*